UNITED STATES PATENT OFFICE.

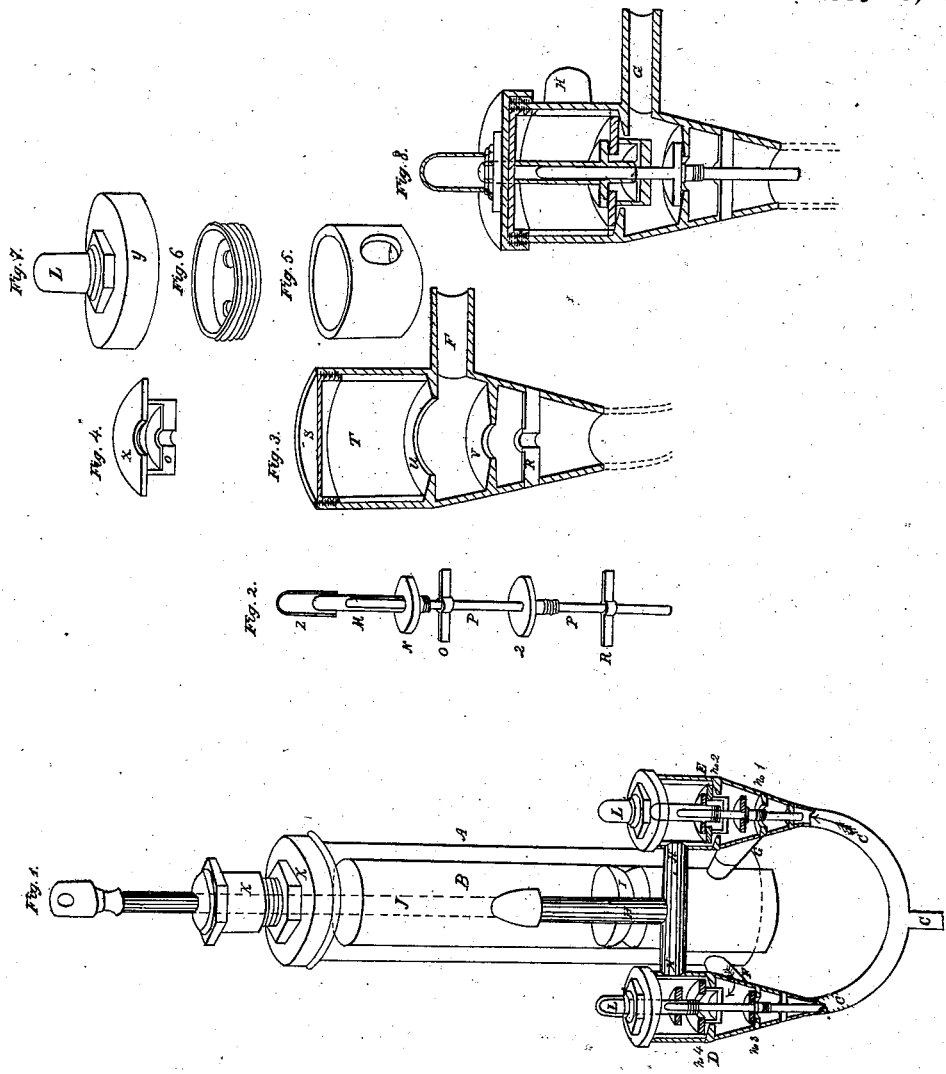

JOSEPH SMART, OF NORTHERN LIBERTIES, PENNSYLVANIA.

PUMP.

Specification of Letters Patent No. 10,708, dated March 28, 1854.

*To all whom it may concern:*

Be it known that I, JOSEPH SMART, of the Northern Liberties, in the county of Philadelphia and State of Pennsylvania, have invented a new and useful Improvement on Double-Action Lifting and Force Pumps; and I do hereby declare that the following is a full, clear, and exact description of the construction and operation of the same, reference being had to the annexed drawings, making a part of this specification, in which—

Figure 1 is a perspective view of the pump. Fig. 2 represents the two valves and stems, the upper valve stem being hollow and sliding upon the lower valve stem. Fig. 3 exhibits the interior of the valve box with gate, lower valve seat, connecting pipe and upper valve bearing. Fig. 4 is the upper valve seat with gate; Fig. 5, an open washer; Fig. 6, a screw cap bearing for washer. Fig. 7 is the box cap. Fig. 8 presents a view of the double valves, valve seats, and gates, open washer, screw cap bearing and stems, in the interior of the box, the connecting and discharging pipes and of the box cap on the box.

Letters A and B in Fig. 1 represent two chambers, of which A is the outward and B the inner chamber. C represents the suction pipe. D, E are the valves. F, G are pipes connecting the chambers and valves. I is the piston; J K, the piston rod, stuff box, and cap.

Letter L in Fig. 2 is a hollow tube on the cap into which the upper valve stem passes. M is the upper valve stem, which is hollow; N, the upper valve; O, the upper valve gate; P, the lower valve stem; Q, the lower valve; R, the lower valve gate.

Letter S in Fig. 3 represents the screw cap bearing; T, the open washer, U, the upper valve bearing; V, the lower valve seat. R is the lower valve gate. F is the pipe connecting the outward chamber and valve D.

Letter X in Fig. 4 is the upper valve seat; O, the upper gate.

Fig. 5 is the open washer; Fig. 6, the screw cap bearing.

Letter L in Fig. 7 is the hollow tube of the box cap. Y is the cap.

Letter G in Fig. 8 represents the pipe connecting the inner chamber of the pump and valve E. H is the discharging pipe.

The parts of the valves above described may be joined as follows, viz: The valve stem letter P in Fig. 2 is inserted in the gate R, the valve Q resting on the valve seat V. The gate of the upper valve seat O and valve seat X in Fig. 4 are placed over the upper part of the stem P, Fig. 2, resting on the valve bearing U, the stem P extending above the valve seat X. The open washer, Fig. 5, is intended to fasten the upper valve seat X to its bearing, and is pressed downward by the screw cap bearing Fig. 6, and the whole is then covered by the box cap, Fig. 7.

The pump is so constructed that should any part of it require to be repaired such repairs may be made without deranging any other part. The valves are arranged so as to give a perpendicular action to the stems, require but little space between them, and thus create but a small vacuum. The pump consists of two chambers, an outward and an inner one. The case with stuffing box is fastened to the outward chamber, the piston rod passing through the stuffing box and cap working the piston in the inner chamber, it and the outward chamber being closed at the bottom air tight. As the piston rod ascends the water flows through the suction pipe C and valve No. 1 by the conecting pipe G to the inner chamber. By thrusting down the piston rod the valve No. 1 is closed and the water is forced to the discharging pipe H through valve No. 2. The piston descending forms a vacuum and the water flows through the suction pipe C and valve No. 3 which closes as the piston reascends and the water is forced back through the connecting pipe F to the discharging pipe H through valve No. 4 thereby giving a double action to the pump.

What I claim as my invention and desire to secure by Letters Patent is—

1. The mode of applying the outward chamber for supplying the inner chamber above the piston and discharging the same, and the manner of connecting the valves with both chambers as above described.

2. I claim the invention of the upper or movable valve seat with gate attached as exhibited by Fig. 4, with the mode of securing the same to its bed by the open washer and inside screw bearing on the top of the washer as above described.

JOSEPH SMART.

Witnesses:
 GEO. W. THORN,
 MATTH. T. THORPE.